United States Patent
Wetoschkin et al.

(10) Patent No.: US 10,809,374 B2
(45) Date of Patent: Oct. 20, 2020

(54) METHOD FOR OPERATING A DRIVER ASSISTANCE SYSTEM FOR MOTOR VEHICLES

(71) Applicant: Robert Bosch GmbH, Stuttgart (DE)

(72) Inventors: Igor Wetoschkin, Freiberg (DE); Gabor Balazs Daroczi, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/473,470

(22) PCT Filed: Nov. 16, 2017

(86) PCT No.: PCT/EP2017/079403
§ 371 (c)(1),
(2) Date: Jun. 25, 2019

(87) PCT Pub. No.: WO2018/121914
PCT Pub. Date: Jul. 5, 2018

(65) Prior Publication Data
US 2019/0369234 A1 Dec. 5, 2019

(30) Foreign Application Priority Data
Dec. 29, 2016 (DE) .......... 10 2016 226 312

(51) Int. Cl.
*G01S 13/93* (2020.01)
*B60W 50/14* (2020.01)
(Continued)

(52) U.S. Cl.
CPC .......... *G01S 13/931* (2013.01); *B60W 50/14* (2013.01); *B60W 2050/0083* (2013.01); *G01S 2007/403* (2013.01); *G01S 2007/4034* (2013.01)

(58) Field of Classification Search
CPC .......... G01S 13/931; G01S 2007/4034; G01S 2007/403; B60W 50/14; B60W 2050/0083
(Continued)

(56) References Cited

U.S. PATENT DOCUMENTS 5,977,906 A 11/1999 Ameen et al.
6,246,949 B1 * 6/2001 Shirai .................. B60W 30/16
701/96
(Continued)

FOREIGN PATENT DOCUMENTS

DE  102013202377 A1  8/2013
JP  2016191686 A  11/2016

OTHER PUBLICATIONS

International Search Report for PCT/EP2017/079403, dated Feb. 23, 2018.

*Primary Examiner* — Adnan Aziz
(74) *Attorney, Agent, or Firm* — Norton Rose Fulbright US LLP; Gerard Messina

(57) ABSTRACT

A method for operating a driver assistance system for motor vehicles which has a radar sensor and a variable scope of functionality, with continuous recalibration of the radar sensor in order to compensate for alignment errors during operation, characterized by the following steps: estimating the alignment error based on a measurement over a limited first operating time period; limiting the scope of functionality of the driver assistance system depending on the estimated alignment error; continuing to measure during operation with a limited scope of functionality within a second operating time period, in order to improve the estimation accuracy of the alignment error; and expanding the scope of functionality in accordance with the improvement in estimation accuracy.

13 Claims, 3 Drawing Sheets

(51) Int. Cl.
*G01S 13/931* (2020.01)
*B60W 50/00* (2006.01)
*G01S 7/40* (2006.01)

(58) Field of Classification Search
USPC ............ 340/436, 686.2, 903; 701/30.5, 31.1
See application file for complete search history.

(56) References Cited

U.S. PATENT DOCUMENTS

| | | | |
|---|---|---|---|
| 8,001,860 B1* | 8/2011 | Preston | B60W 40/11 |
| | | | 73/866.5 |
| 9,930,323 B2* | 3/2018 | Zeng | G06T 7/80 |
| 10,578,714 B2* | 3/2020 | Matsunaga | B60W 30/085 |
| 2002/0138223 A1* | 9/2002 | Schneider | G01S 7/4026 |
| | | | 702/104 |
| 2005/0062615 A1* | 3/2005 | Braeuchle | G01S 13/867 |
| | | | 340/903 |
| 2012/0253549 A1* | 10/2012 | Cund | G01S 13/584 |
| | | | 701/1 |
| 2013/0218398 A1* | 8/2013 | Gandhi | G01S 17/931 |
| | | | 701/31.1 |
| 2015/0276923 A1* | 10/2015 | Song | G01S 7/4026 |
| | | | 702/97 |
| 2016/0223649 A1* | 8/2016 | Schwindt | G01S 7/4026 |
| 2017/0261600 A1* | 9/2017 | Maennicke | G01S 7/4026 |
| 2018/0120417 A1* | 5/2018 | Matsunaga | B60W 30/085 |

* cited by examiner

METHOD FOR OPERATING A DRIVER ASSISTANCE SYSTEM FOR MOTOR VEHICLES

FIELD OF THE INVENTION

The invention relates to a method for operating a driver assistance system for motor vehicles which has a radar sensor and a variable scope of functionality, with continuous recalibration of the radar sensor in order to compensate for alignment errors during operation.

BACKGROUND INFORMATION

The functionality of a driver assistance system for motor vehicles is often based on the localization data of a radar sensor which is built into the vehicle at the front and with which distances, relative speeds, azimuth angles, and optionally also elevation angles of preceding vehicles and other objects in the surroundings of the vehicle are measured. On the basis of those data the driver assistance system then makes a variety of assistance functions available, for example automatic separation control, collision warning functions, automatic initiation of emergency braking to avoid a collision, and the like. Reliable and error-free operation of the driver assistance system requires appropriate evaluation of the traffic environment, including correct assumptions as to the azimuth angle of the localized objects. Correct angle measurements with the aid of the radar sensor are only possible, however, if the sensor has been correctly aligned upon installation in the vehicle, so that the direction that corresponds to an azimuth angle measurement of 0° is also in fact the forward direction of the vehicle.

Driver assistance systems having a calibration module that allows correct alignment of the radar sensor to be checked during operation of the vehicle, and allows recognized alignment errors to be compensated for computationally as long as they are still within a tolerable range, are known.

As a rule, however, a quantitative determination of an alignment error is only possible by statistical evaluation of measurements that are acquired over a certain period of time. A sufficiently accurate and reliable determination of the alignment error therefore requires a certain measurement time span, with the result that if an alignment error occurs suddenly, for example due to impacts on the vehicle that often occur in the context of a minor "bump" in a parking area, the error can only be recognized and compensated for with a considerable delay. If what is required, on the other hand, is that the driver assistance functions be used only if alignment errors have been recognized and compensated for with sufficient certainty, the availability of the assistance function is then limited.

SUMMARY

An object of the invention is therefore to describe a method that allows alignment errors to be recognized more quickly, and allows the availability of the driver assistance system to be enhanced.

This object is achieved according to the present invention by a method having the following steps:
 estimating the alignment error based on a measurement over a limited first operating time period;
 limiting the scope of functionality of the driver assistance system depending on the estimated alignment error;
 continuing to measure during operation with a limited scope of functionality within a second operating time period, in order to improve the estimation accuracy of the alignment error; and
 expanding the scope of functionality in accordance with the improvement in estimation accuracy.

The invention is based on the consideration that even when the exact magnitude of an alignment error is not yet reliably established, utilization of the driver assistance system is still possible provided the scope of functionality is suitably limited in consideration of the uncertainty in terms of the alignment error. For example, alignment errors that result in a falsified angle measurement naturally have an effect principally in terms of determining the position of objects that are very far away. The uncertainty in terms of angle measurement can therefore be taken into account by limiting the radar sensor range that is used. A substantial portion of the driver assistance functions can therefore be used despite a certain limitation of the scope of functionality, so that availability as a whole is enhanced. As the driver assistance system operates further with a restricted scope of functionality, it is then possible to continuously improve the estimate of the alignment error by way of continued measurements. When it is established with sufficient reliability that the alignment error is within a tolerable range, the scope of functionality of the driver assistance system can be expanded again.

This method makes it possible to omit the initial calibration of the radar sensor upon installation in the vehicle, or at least to simplify and abbreviate the procedures upon initial calibration. Installation times are thereby shortened, and a cost saving is thereby achieved.

The invention furthermore offers the advantage that the system reacts more quickly to alignment errors that spontaneously occur only later, during operation of the vehicle. As soon the relatively short initial operating time period since the occurrence of the alignment error has elapsed, a rough estimate of the misalignment is possible and can serve, to begin with, as justification for an initial suspicion that an alignment error exists. The system reacts thereto with a limitation of the scope of functionality and a continuation of the measurements, until ultimately the alignment error has been quantitatively detected with greater accuracy. If the more-accurate measurements then do not confirm the suspicion of the existence of an alignment error, or do not permit compensation, the scope of functionality can be automatically expanded again.

The nature and extent of the restrictions on the scope of functionality can depend on the result of the estimate of the alignment error. When the estimation accuracy then increasingly improves during the second operating period as a result of the longer measurement duration, the limitations on the scope of functionality can then successively be removed until finally the full scope of functionality is available again.

A further subject of the invention is a driver assistance system that is embodied to carry out the method described above.

DETAILED DESCRIPTION

Figure 1:
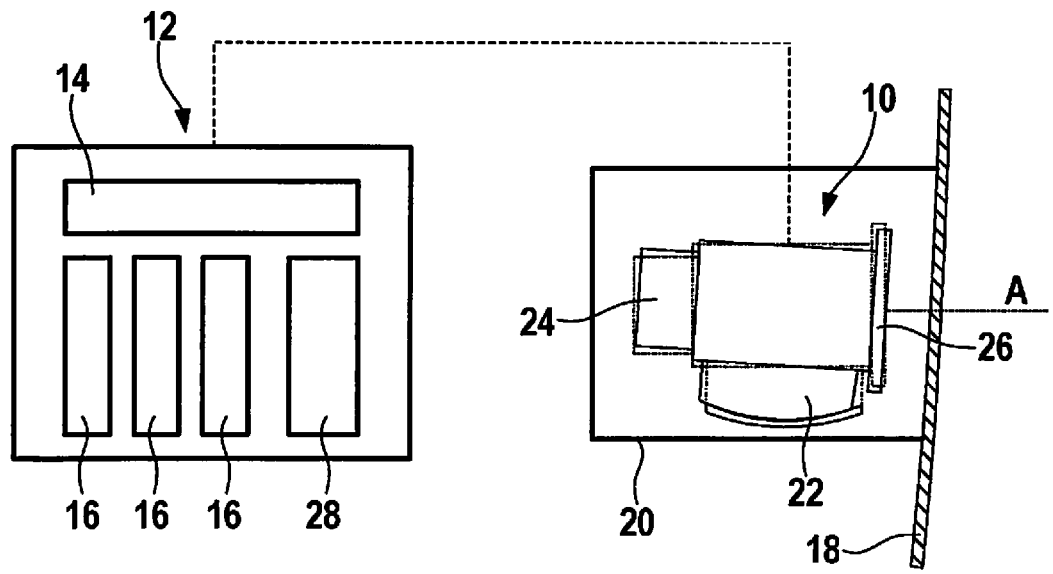
FIG. 1 is a block diagram of a driver assistance system according to the present invention, depicting a radar sensor in a side view.

FIG. 1 is a block diagram depicting a driver assistance system for a motor vehicle. The driver assistance system has a radar sensor 10 and an electronic control device 12 that evaluates localization data of radar sensor 10 and, on the basis of those data, controls actuators (not shown) of the motor vehicle. Control device 12 has for that purpose an evaluation module 14 that evaluates the localization data of radar sensor 10, as well as several assistance modules 16 that perform various assistance functions, for example separation control, a stop-and-go function for heavy traffic, and a collision warning function.

Radar sensor 10 is installed in an installation housing 20 behind a radome 18, for example a front bumper of the vehicle which is made of plastic and is therefore transparent to microwaves, and is alignable in elevation by way of a first mechanical alignment apparatus 22 and in azimuth by way of a second mechanical alignment apparatus 24. An axis A depicted as a dot-dash line indicates the principal emission and reception direction of the radar sensor, and proceeds through the center of a planar group antenna 26 of the radar sensor and at right angles to the plane of that group antenna.

Alignment errors both in elevation and in azimuth can occur upon installation of radar sensor 10. An alignment error in elevation is indicated in FIG. 1 with dot-dash lines. Alignment errors can also occur spontaneously during operation of the vehicle, for example due to impacts in the context of minor collisions between the vehicle body and other objects, or (in elevation) if the vehicle is unusually heavily loaded. Control device 12 therefore has a calibration module 28 (software module) that is capable of automatically recognizing such alignment errors on the basis of the data supplied by radar sensor 10 and then correspondingly correcting the results of the angle measurements.

Figure 2:
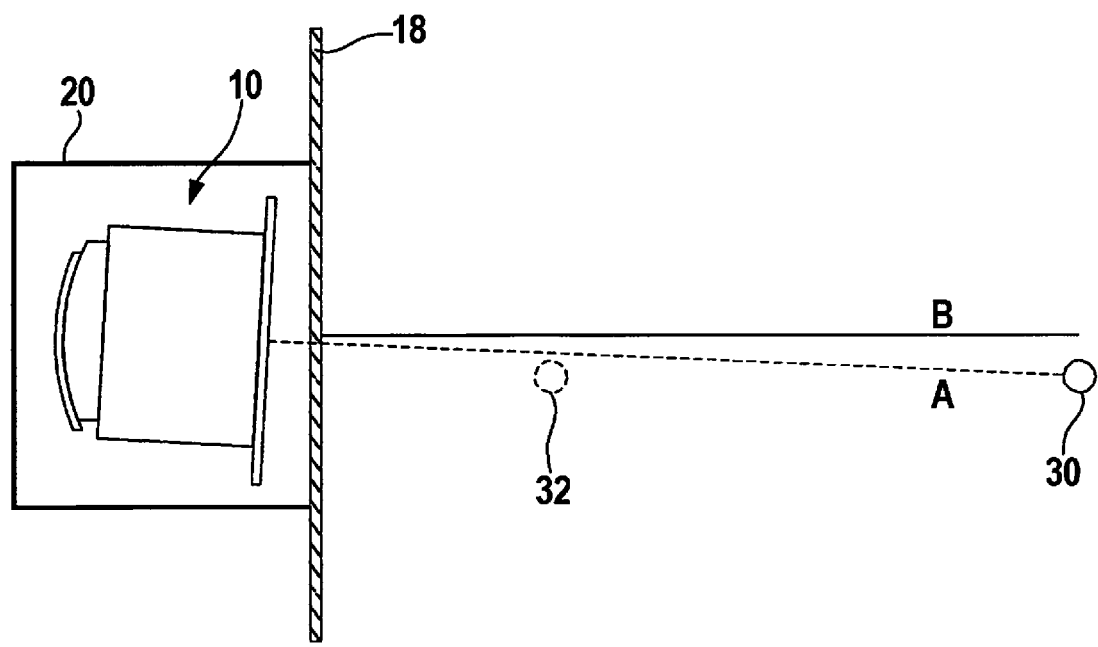
FIG. 2 is a sketch to explain the principle of a method for estimating an alignment error of the radar sensor, depicting the radar sensor of FIG. 1 in a plan view.

FIG. 2 illustrates by way of example the manner in which calibration module 28 can recognize installation errors. It shows an alignment error in azimuth, which is expressed by the fact that the transmission and reception direction of radar sensor 10 (axis A) forms a certain angle with longitudinal center axis B of the motor vehicle. As an example, it is assumed here that an object 30 is located exactly on axis A of the radar sensor. The azimuth angle measured for that object would thus be 0°. If the radar sensor were correctly aligned, this would mean that object 30 is located on longitudinal center axis B of the vehicle and that the measured azimuth angle would thus be independent of the distance of object 30, i.e. would remain at a value of 0° even if object 30 moved closer or farther away. The reference number 30' [sic; 30] in FIG. 2 designates a position of object 30 in which it has the same lateral offset but is at a shorter distance from the radar sensor. It is evident that position 30 is no longer located on axis A, and that the measured azimuth angle is therefore different from 0°. Based on this discrepancy between the expected result of the angle measurement (0°) and the result actually obtained, calibration module 28 can recognize and quantitatively determine the existence of an alignment error.

For a quantitative determination of the alignment error, however, it is assumed that both object 30 and the ego vehicle (and thus radar sensor 10) maintain their lateral position without change. Changes in the lateral position of the ego vehicle can be determined by measuring transverse acceleration or by detecting the steering angle. For object 30, however, it is not certain that the lateral position is really remaining unchanged. In order to obtain a reliable or at least approximately correct result for the alignment error, measurements of the kind depicted (in simplified fashion) in FIG. 2 is therefore in general be repeated several times for a plurality of objects and evaluated statistically, so that incorrect assumptions and statistical fluctuations are averaged out. The accuracy with which the alignment error can be quantitatively determined therefore improves as the measurement time increases. Conversely, this means that in principle, reliable recognition and correction of alignment errors is possible only with a certain delay; this has undesirable implications for road safety.

It has therefore hitherto been usual to check the alignment of radar sensor 10 under controlled conditions on a test stand immediately after installation. If it is found in this context that a certain alignment error exists but that it is relatively small and within a permissible range such that functionality of the driver assistance system is not impaired, it is possible to dispense with mechanical realignment of the radar sensor and instead to compensate for the measured alignment error computationally in calibration module 28.

A method will be described below which allows the outlay for such calibration measurements on the test stand to be reduced or allows such calibration measurements to be omitted entirely, without thereby creating safety risks.

Figure 3:
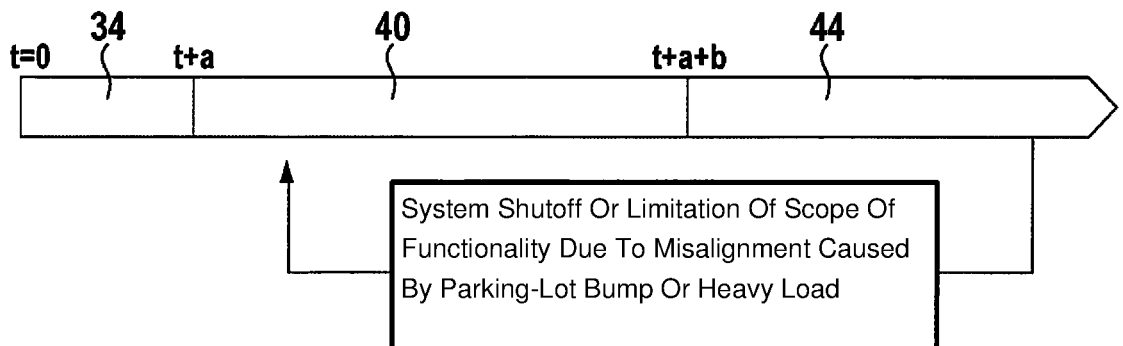
FIG. 3 is a time diagram to explain the method according to the present invention.

FIG. 3 depicts execution of the method in a time diagram. Time t=0 is the point in time at which the vehicle and the driver assistance system are put into service. This time is followed by a calibration phase 34 (limited first operating time period) in which the alignment of the radar sensor is checked under normal driving conditions with the aid of calibration module 28. The calibration phase has a duration a that corresponds to traveling a distance of only a few meters. Within that comparatively short time span, comparatively large measurement tolerances in the measurement of the alignment error occur.

Figure 4:
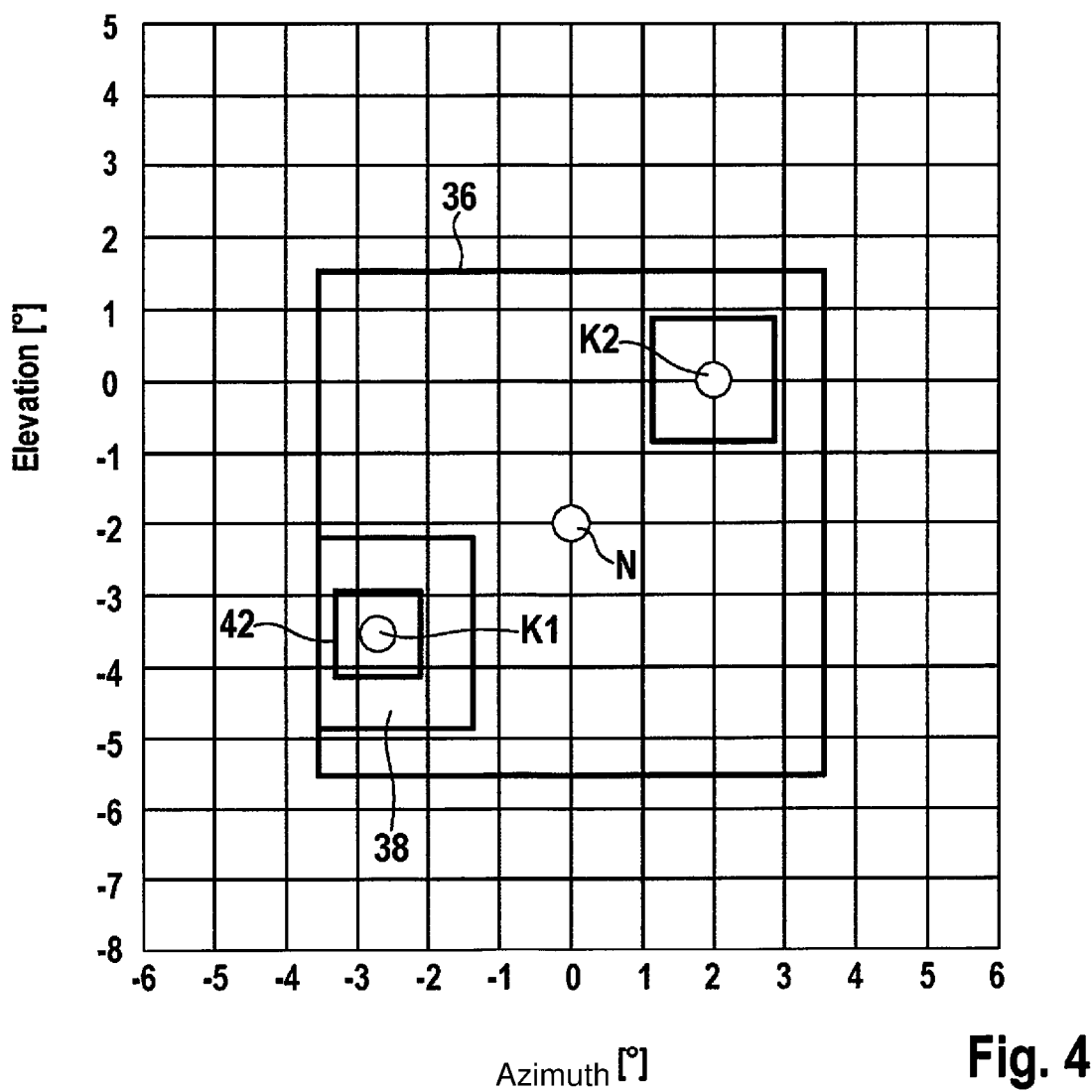
FIG. 4 depicts alignment errors of the radar sensor in azimuth and in elevation.

FIG. 4 schematically shows a solid angle segment that extends over azimuth angles from −6° to +6° and elevation angles from −8° to +5°. A dot N indicates the nominal alignment position of the radar sensor. In the example shown here, that position is located at an azimuth angle of 0° and an elevation angle of −2°. A square 36 centered on dot N designates a permissible region within which alignment errors can be tolerated. If it is reliably established that the actual alignment error of radar sensor 10 is within that region, the misalignment can be corrected computationally and all assistance functions 16 can be used.

A dot K1 designates the result of a calibration measurement that was obtained at the end of calibration phase 34. This dot is located within square 36. If dot K1 correctly indicated the actual alignment error, the alignment error could therefore be tolerated. Because of the short measurement time, however, the measurement has considerable error tolerances. The region of the error tolerances is indicated here by a field 38 centered on dot K1. It is thus probable, but not yet certain, that the alignment error is located within the permissible region. Safe operation of the assistance functions therefore cannot be completely guaranteed.

Safe utilization of the assistance functions is possible, however, if their scope of functionality is suitably limited. As a simple example, let it be assumed that for safe utilization of the assistance functions with a full scope of functionality, it is necessary for the lateral positions of the localized objects (in the direction perpendicular to longitudinal center axis B of the vehicle) to be known with an accuracy of +/−0.2 m. It is necessary for that purpose to measure the azimuth angle of the objects with an accuracy that depends on the respective distance of the object. A more accurate angle measurement is necessary at long object distances, while larger measurement errors in the angle measurement can be tolerated for shorter object distances. It is therefore possible to utilize the assistance function to a limited extent by restricting the range of the radar sensor with respect to the nominal range. In other words, the scope of functionality of the assistance functions is limited by the fact that only objects that are located within the restricted range are evaluated.

In the time diagram in FIG. 3, this limitation of the scope of functionality would take place at the end of calibration phase 34, at time t+a. That point in time is followed by a validation phase 40 (second operating time span) in which the driver assistance system is utilized with a limited scope of functionality while the calibration measurements are continued. The accuracy with which the alignment error can be measured improves because of the longer measurement time. This is depicted in FIG. 4 by the fact that the error tolerance region around dot K1 shrinks to the size of square 42. The measurement of the alignment error using this narrower error tolerance is complete at time t+a+b. Because it is known at that point in time that the actual alignment error is within the narrower permissible region, the range of the radar sensor can be increased again to the nominal value, so that the full scope of functionality of the driver assistance system is once again available.

A utilization phase 44 of the driver assistance system, which in principle is unlimited in terms of time, then begins. The alignment error, indicated by dot K1, is now known with sufficient accuracy and can be computationally compensated for in calibration module 28, so that the traffic environment can be correctly detected.

It is understood that the considerations above also apply, mutatis mutandis, to alignment errors in elevation. It is also understood that the limitation of the scope of functionality does not necessarily need to involve a restriction of range, but can also involve, for example, completely shutting off certain assistance functions.

At time t+a, the driver of the vehicle can receive a warning message notifying him or her that temporarily, only a limited scope of functionality of the driver assistance system is available. Such a notification is not necessary in all cases, however. The full range of the radar sensor is generally required only for separation control at a relatively high driving speed, since the requisite safe separations between the vehicles are then so large that the full range of the radar sensor is utilized in order to ensure that the safe separations can reliably be maintained. At a slower driving speed, however, very distant objects do not yet need to be taken into account, so that the range restriction does not have serious consequences and it is therefore not necessary to inform the driver regarding that action.

In the exemplifying embodiment shown here, calibration measurements are also continued during utilization phase 44. For example, the alignment error is constantly measured, and if it becomes apparent, after a certain number of measurements and after statistical evaluation, that the alignment has changed (for example, due to a parking-lot bump) so that the alignment error is no longer represented by dot K1 in FIG. 4 but instead, for example, by dot K2, and if the error tolerance region is still too large for a final judgment because of the short measurement time, the scope of functionality will then once again be limited (or, in an extreme case, the assistance function will be completely shut off), and a new validation phase 40 will be initiated. If it can be established with sufficient certainty at the end of that validation phase that the alignment error is within the permissible region, the scope of functionality is then expanded again, and utilization phase 44 is continued with full driver assistance system functionality.

Figure 5:
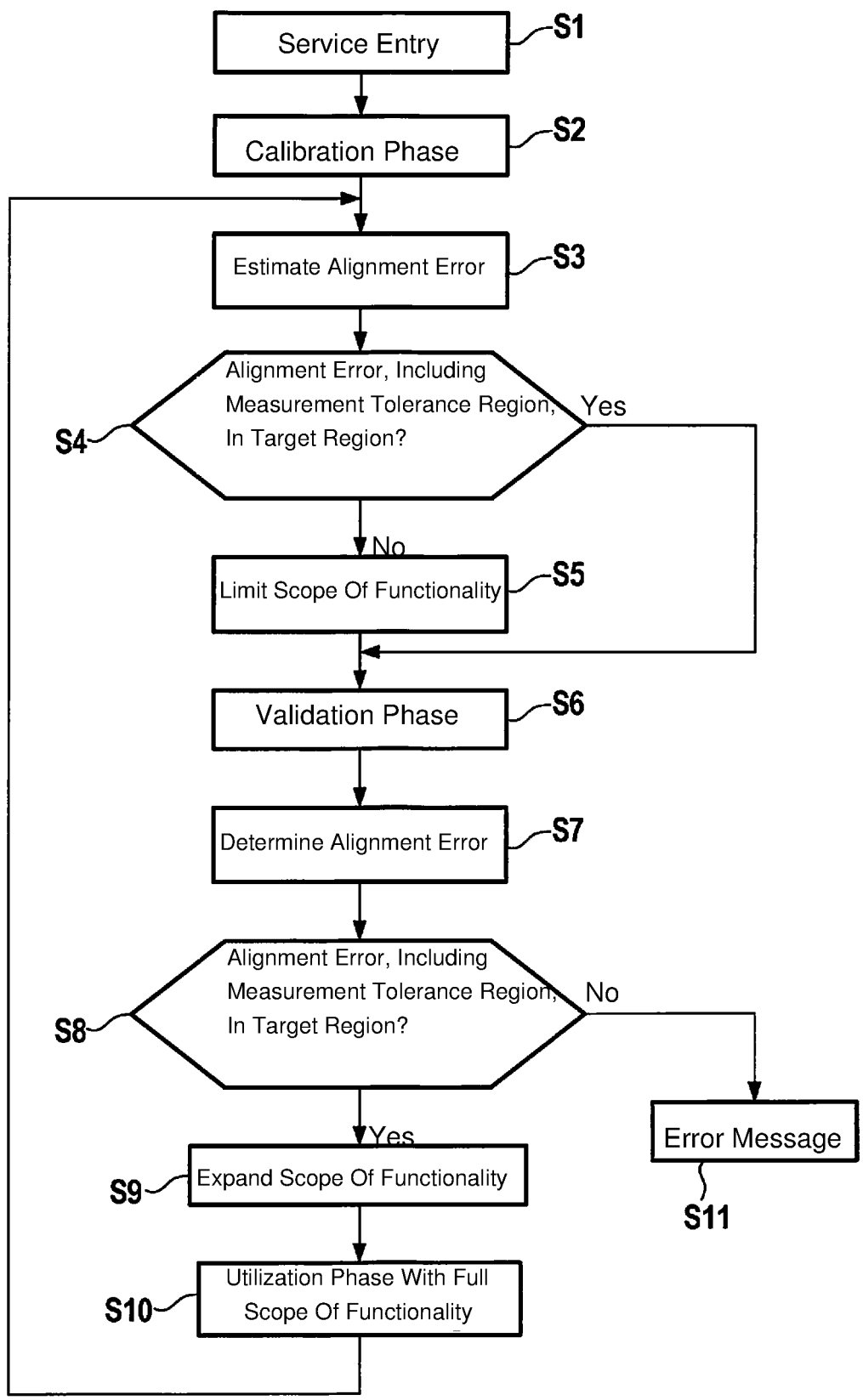
FIG. 5 is a flow chart to explain the method according to the present invention.

FIG. 5 depicts the steps of the above-described method in a flow chart.

In step S1 the driver assistance system is put into operation, with no obligatory need to carry out a calibration measurement on the test stand. This is followed by calibration phase 34 in which, in step S2, the calibration measurements are carried out under normal driving conditions. The calibration phase ends with a (rough) estimate of the alignment error in step S3. Step S4 checks whether the alignment error, including the measurement tolerance, is within the permissible region. If not (No), then in step S5 the scope of functionality of the driver assistance system is limited, and in step S6 the validation phase begins. If the result of the query in step S4 is positive (Yes), step S5 is skipped.

In step S7 the alignment error is determined again, but with higher accuracy because of the longer measurement times.

The query in step S8 corresponds to the one in step S4. If the alignment error is tolerable ("Yes" response), then in step S9 the scope of functionality is expanded again and utilization phase 44 begins in step S10. After initiation of the utilization phase, execution branches back to step S3. The new estimate of the alignment error in step S3 corresponds to the control measurement within utilization phase 44 in FIG. 3.

If it is found in step S8 that the alignment error is not tolerable ("No" response), the scope of functionality then remains limited, and in step S11 the driver receives an error message and, if applicable, a prompt to find a repair facility. Optionally, the driver assistance system can also be completely shut off in this step. As an alternative, it is possible to continue utilization of the driver assistance with a limited scope of functionality, and also to repeat the control measurements at regular intervals in order to detect any further changes in alignment and react to them appropriately.

What is claimed is:

1. A method for operating a driver assistance system for a motor vehicle having a radar sensor and a variable scope of functionality, the method comprising:
   during a first operating time period in which estimations of an alignment error of the radar sensor are assigned a first estimation accuracy having a first estimation tolerance range:
     in a first estimation, estimating the alignment error of the radar sensor based on data obtained from a measurement performed using the radar sensor; and
     in a first range determination, determining whether the alignment error estimated in the first estimation, modified by the first estimation tolerance range, represents potential error external to a predefined alignment error range;
   responsive to a result of the first range determination being that the estimated alignment error modified by the first estimation tolerance range represents the potential error external to the predefined alignment error range, limiting the scope of functionality of the driver assistance system;

during a second operating time period that follows the first operating time period an in which (a) the estimations of the alignment error of the radar sensor are assigned a second estimation accuracy having a second estimation tolerance range that is smaller than the first estimation tolerance range and (b) the driver assistance system is operated with the limited scope of functionality:

in a second estimation, estimating the alignment error of the radar sensor based on further data obtained from a further measurement performed using the radar sensor; and in a second range determination, determining whether the alignment error estimated in the second estimation, modified by the second estimation tolerance range, represents the potential error external to the predefined alignment error range; and responsive to a result of the second range determination being that the estimated alignment error modified by the second estimation tolerance range does not represent the potential error external to the predefined alignment error range, expanding the scope of functionality of the driver assistance system.

2. The method as recited in claim 1, wherein the limiting of the scope of functionality includes reducing a range of the radar sensor.

3. The method as recited in claim 1, wherein the driver assistance system includes a plurality of assistance functions, and wherein the limiting of the scope of functionality includes shutting off one of the plurality of assistance functions.

4. The method as recited in claim 1, wherein the expanding of the scope of functionality is performed successively in several steps, each after an improvement in the estimation accuracy.

5. The method as recited in claim 1, wherein the method is executed immediately after the driver assistance system is put into service.

6. The method as recited in claim 1, wherein the method is executed repeatedly during a utilization phase of the driver assistance system.

7. The method as recited in claim 1, wherein the expanding of the scope of the functionality is performed irrespective of whether the estimated alignment error of the second operating time period is the same as the estimated alignment error of the first operating time period.

8. The method as recited in claim 1, wherein the expanding of the scope of the functionality is performed even though the estimated alignment error of the second operating time period is different than the estimated alignment error of the first operating time period.

9. The method as recited in claim 1, wherein the expanding of the scope of the functionality is performed even though the estimated alignment error of the second operating time period is the same as the estimated alignment error of the first operating time period in response to which the functionality was limited.

10. The method as recited in claim 1, wherein:
the modification of the estimated alignment error of the first operating time period by the first estimation tolerance range includes respective additions of a first range of potential offsets to the estimated alignment error of the first operating time period to obtain a first range of potential errors that are each compared, in the first range determination, to the predefined alignment error range; and the modification of the estimated alignment error of the second operating time period by the second estimation tolerance range includes respective additions of a second range of potential offsets to the estimated alignment error of the second operating time period to obtain a second range of potential errors that are each compared, in the second range determination, to the predefined alignment error range.

11. A driver assistance system for a motor vehicle and having a variable scope of functionality, the system comprising:
a radar sensor; and
a control device, wherein the control device is configured to:
during a first operating time period in which estimations of an alignment error of the radar sensor are assigned a first estimation accuracy having a first estimation tolerance range:
in a first estimation, estimate the alignment error of the radar sensor based on data obtained from a measurement performed using the radar sensor; and
in a first range determination, determine whether the alignment error estimated in the first estimation, modified by the first estimation tolerance range, represents potential error external to a predefined alignment error range;
responsive to a result of the first range determination being that the estimated alignment error modified by the first estimation tolerance range represents the potential error external to the predefined alignment error range, limit the scope of functionality of the driver assistance system,
during a second operating time period that follows the first operating time period an in which (a) the estimations of the alignment error of the radar sensor are assigned a second estimation accuracy having a second estimation tolerance range that is smaller than the first estimation tolerance range and (b) the driver assistance system is operated with the limited scope of functionality:
in a second estimation, estimate the alignment error of the radar sensor based on further data obtained from a further measurement performed using the radar sensor; and
in a second range determination, determine whether the alignment error estimated in the second estimation, modified by the second estimation tolerance range, represents the potential error external to the predefined alignment error range; and
responsive to a result of the second range determination being that the estimated alignment error modified by the second estimation tolerance range does not represent the potential error external to the predefined alignment error range, expand the scope of functionality of the driver assistance system.

12. The system as recited in claim 11, wherein the control device is configured to perform the expansion of the scope irrespective of whether the estimated alignment error of the second operating time period is the same as the estimated alignment error of the first operating time period.

13. The system as recited in claim 11, wherein:
the modification of the estimated alignment error of the first operating time period by the first estimation tolerance range includes respective additions of a first range of potential offsets to the estimated alignment error of the first operating time period to obtain a first range of potential errors that are each compared, in the first range determination, to the predefined alignment error range; and the modification of the estimated alignment error of the second operating time period by the second estimation tolerance range includes respective additions of a second range of potential offsets to the estimated alignment error of the second operating time period to obtain a second range of potential errors that are each compared, in the second range determination, to the predefined alignment error range.

* * * * *